United States Patent Office 2,972,542
Patented Feb. 21, 1961

2,972,542

PREPARING DEODORIZED FISH PRODUCTS

Ezra Levin, 1109 W. University, Champaign, Ill.

No Drawing. Filed Feb. 9, 1959, Ser. No. 791,837

7 Claims. (Cl. 99—209)

This invention relates to the preparation of products from fish, or other sea animals, and more particularly to the manufacture of deodorized materials from these substances.

The consumption of preparations from sea animals has increased considerably, and the undeveloped potential uses for proteinaceous material from sea animals is enormous. Furthermore, there is a practically inexhaustible supply of sea animals available to all continents of the world. However, consumption of the sea animal products is greatly impaired by palatability, since the characteristic fish odors and smells are retained in the various products derived therefrom. In certain parts of the world fish odors are desired, but in other places they are objectionable.

Various methods have been proposed for the removal of fish odors, including treatment with alcohol, such as methyl alcohol and ethyl alcohol, or ethyl acetate. In the case of these deodorizing treatments, it is ordinarily necessary to employ many washings, or treatments, with the alcohol, or ethyl acetate, to reduce the fish odor to a point where it is not objectionable to some persons.

The patent to Galliver et al. 2,813,027, proposes the deodorizing of fish flesh by treatment with alcohol at pH's of at least 8, or higher. The required pH may be obtained by adding an aqueous alkali, such as sodium, or calcium hydroxide, or sodium carbonate. Alternatively, the pH may be obtained in the desired range by using the sodium salt of sulphurous acid, according to that patent.

The present invention has as its principal object an improved process for obtaining deodorized products from sea animals. It is also an object of the invention to prepare sea animal products which are deodorized to a degree heretofore unobtainable. Another object of the invention is to provide an inexpensive and efficient process for preparation of deodorized sea animal products. Still another object is to prepare products from sea animals which are nutritive, and also palatable, when added to human, or animal, diets. Other objects of the invention will become apparent as the description proceeds.

To the accomplishment of the foregoing and related objects, the present invention includes the features hereinafter fully described and pointed out in the claims, the following description setting forth in detail certain illustrative embodiments of the invention, these being indicative, however, of but a few of the various ways in which the principles of the invention may be employed.

While not intending to be bound thereby, it is applicant's theory, as the result of investigations, that the odors in the fish flesh are derived from two types of compounds; those which are:

(1) Fat soluble.
(2) Non-fat soluble, for example, the amino-compounds, or other odoriferous materials.

It is one discovery of the invention that elimination of fish odor requires removal of both of the foregoing fish flesh components. Another discovery, related to the foregoing, is that if substantially all the fat is removed, it is relatively easy to deodorize fish flesh.

Many solvents which dissolve fat are also water-miscible, for instance, methyl and ethyl alcohol. While these remove the fat from raw fish, they also denature in a manner which injures the protein tissues. It has been discovered that, if the fat and water are first removed by a fat solvent that forms an azeotrope with water, the non-fat soluble odoriferous material can be readily removed, for example, by washing with a water-miscible solvent, such as methyl or ethyl alcohol, or by treating with an oxidizing agent.

Briefly stated, the present invention is concerned with a method for removing undesirable odors and fishy smells from proteinaceous material obtained from sea animals by the steps which comprise removing the water and defatting the proteinaceous material to a fat content less than 1% by weight, preferably substantially, completely eliminating lipid materials, and subsequently, reducing the remaining odoriferous materials by, for instance, treating the defatted proteinaceous material with an alcohol, or with an oxidizing agent. Also, the present invention relates to products produced by the foregoing process.

The sea animals employed in the process may be, for example, starfish, white sea fish, such as cod, whiting, haddock, sea-ream, coal fish, dog fish, catfish, shark, and fresh water fish, such as carp. The process is also applicable to low grade starting materials such as fish viscera, or fish offal.

The fish material is first subject to mechanical disintegration, such as by comminution with a grinder, or hammermill, to produce particles of a small size. The starting material may be the whole animal or eviscerated, and/or skinned fish.

After comminution, or grinding, the fat is removed from the sea animal material by a solvent. Applicant has discovered that this can be accomplished effectively by extraction with an organic water-immiscible, polar solvent. Polar solvents have been found unusually effective in removing fat that is bound in the tissues, so that the fat level may be reduced to only traces. The solvent should also remove the water, as by forming an azeotrope therewith, but must be water-immiscible to prevent injury to the tissues. Suitable fat solvents include the halogenated hydrocarbons, particularly the halogenated derivatives of low boiling aliphatic hydrocarbons which may include the chlorine, bromine, and in some instances fluorine derivatives.

The fat solvent should be of the type that causes the fat to become disassociated from the fish tissue, so that the lipid content is less than 1% by weight at the completion of the operation, preferably only traces, and most desirably substantially completely eliminated. The more fat that is removed, the easier it is to deodorize fish meal. By removing substantially all the fat, most of the fish odors are also eliminated.

Use of an organic polar solvent makes it possible to disassociate and remove the fat from the proteinaceous material to unusually low amounts, for example, less than 1.5% by weight. A solvent that has been found to be particularly effective in the defatting operation is dichloroethane.

The comminuted sea animal material may be introduced in pulpable form into a vessel containing the organic polar solvent. The vessel may be evacuated and the contents heated to the boiling point of the solvent, but below the temperature at which the protein in the fish tissue will be deleteriously affected. The organic solvent may be distilled to remove the water in the tissues after which the pressure may be restored to atmospheric pressure, during which more heat is applied to maintain the solvent at its boiling temperature.

During the distillation of solvent, the amount of organic solvent in the vessel is maintained in sufficient quantities to keep the fish particles in suspension and an excessive amount required to dissolve the fat. This may be accomplished by having an excess of solvent in the vessel at the beginning of the operation, or by adding additional solvent during the defatting operation.

If dichloroethane is employed, the temperatures will be in the range from about 60 to 100° C. at atmospheric pressure.

The lipids are dissolved in the organic solvent in the vessel, while the water is carried over into the distillate. At the completion of the defatting operation, the solvent is merely drained from the fish material.

The defatted proteinaceous material is treated to remove the non-fat soluble odoriferous materials. This may be done by washing with an alcohol having less than five carbon atoms, such as with methyl alcohol, or ethyl alcohol, in order to reduce the remaining odoriferous materials, for instance, those attributable to the aminocompounds, or other compounds contributing to the fishy odor or taste. As little as one, or two, washings with alcohol are necessary to complete the deodorizing treatment, and the resulting product is much more free from odor than previous alcohol treated fish products. Excess amounts of alcohol to fish products may be used, for example, 5 parts alcohol to 1 part by weight of fish. Ambient temperatures may be used, although higher temperatures may be advantageous in some circumstances. The product may be dried in any conventional manner, for example, by evaporation under vacuum treatment with steam, and/or heating.

Alternatively, the remaining odoriferous materials, such as amino-compounds, may be removed from the defatted product by oxidation with standard oxidizing agents, such as sodium hypochlorite, hydrogen peroxide, chlorine gas and the like. A suitable oxidizing material is a 0.3% solution of sodium hypochlorite. It should be kept in mind that the oxidizing agents must be applied only to a fat free material, since any residual fat is made rancid by oxidation.

Another operation for removing odoriferous materials is volatilization with steam. It is not to be assumed, however, that the odoriferous materials are removed with equal efficiency by each of the foregoing operations. Also, it may be desirable in some instances to combine several different steps for eliminating the amino-compounds, or other odoriferous materials. Thus, the steam operation may well be used after alcohol treatment.

The final product may be used as a supplement in human, or animal, diets to increase the protein, or other nutritive, content. Dietetic studies have shown the protein materials, prepared according to the processes disclosed herein, increase the weight gains of malnourished children, without allergies, toxicities, or anorexia. Gomez et al., Bol. Med. del Hospital Infantil, vol. XV, No. 4, pages 485–494.

The following examples are for the purpose of further illustrating the process and are not to be construed as limiting the invention to the exact materials, or procedural conditions, therein described.

*Example I*

Shark, treated with hot water, as disclosed in copending application Serial No. 785,578, filed January 8, 1959, by the same inventor, was comminuted in a "Rietz" prebreaker. It was then pumped into boiling dichloroethane and the water was removed by azeotropic distillation. When the material had been dehydrated to the desired point, it was removed from the boiling solvent which had at this point extracted most of the lipid fraction. Further, fat removal was effected by washing the dehydrated material with fresh dichloroethane. Residual solvent was then removed by heat and vacuum.

Next, methyl alcohol was added in amounts of approximately 5 times the volume of the material; the mixture was stirred and the alcohol removed. This procedure was repeated once, the alcohol was removed by the application of heat and vacuum and the material was ground to uniform size. The meal thus produced was free from fish odor and of high nutritive value.

*Example II*

Shark, treated with hot water as revealed in copending application Serial No. 785,578, filed January 8, 1959, by the same inventor was comminuted in a "Rietz" prebreaker. It was then pumped into boiling dichloroethane and the water was removed by azeotropic distillation. When the material had been dehydrated to the desired point it was removed from the boiling solvent which had at this point extracted most of the lipid fraction. Further fat removal was effected by washing the dehydrated material with fresh dichloroethane. Residual solvent was then removed by heat and vacuum.

An aqueous solution containing 2% sodium hypochlorite was added in amount of 15% of the weight of the material. The excess water was removed by application of heat and vacuum. The meal thus produced was free from fish odor and of high nutritive value. It did not contain any residual sodium hypochlorite, and by test on two species (rats and chicks) showed no indication of toxicity.

Other modes of applying the principle of the invention may be employed, change being made as regards the details described, provided the features stated in any of the following claims or the equivalent of such be employed.

I, therefore, particularly point out and distinctly claim as my invention:

1. A method for removing undesirable odors and fishy smells from proteinaceous material obtained from sea animals, the steps which comprise: removing water from and defatting said proteinaceous material to a fat content less than 1% by weight by contacting with a water-immiscible, polar solvent that forms an azeotrope with water and removes the fat, and subsequently treating said defatted proteinaceous material with an alcohol having less than five carbon atoms.

2. The method of claim 1 wherein said alcohol is ethyl alcohol.

3. The method of claim 1 wherein said alcohol is methyl alcohol.

4. The method of claim 1 wherein said proteinaceous material is defatted by solvent extraction with dichloroethane.

5. A method for removing undesirable odors and fishy smells from proteinaceous material obtained from fish, the steps which comprise: removing substantially completely the fat from said proteinaceous material by solvent extraction with dichloroethane, and then washing said defatted proteinaceous material with an alcohol having less than five carbon atoms.

6. The method of claim 5 wherein said alcohol is ethyl alcohol.

7. The method of claim 5 wherein said alcohol is methyl alcohol.

References Cited in the file of this patent

UNITED STATES PATENTS

| | | |
|---|---|---|
| 1,934,677 | Ash | Nov. 14, 1933 |
| 2,539,544 | Levin et al. | Jan. 30, 1951 |
| 2,619,425 | Levin | Nov. 25, 1952 |
| 2,813,027 | Galliver et al. | Nov. 12, 1957 |